Jan. 7, 1930.   R. C. HUNEYCUTT   1,742,812
COTTON GIN ATTACHMENT
Filed Feb. 4, 1929
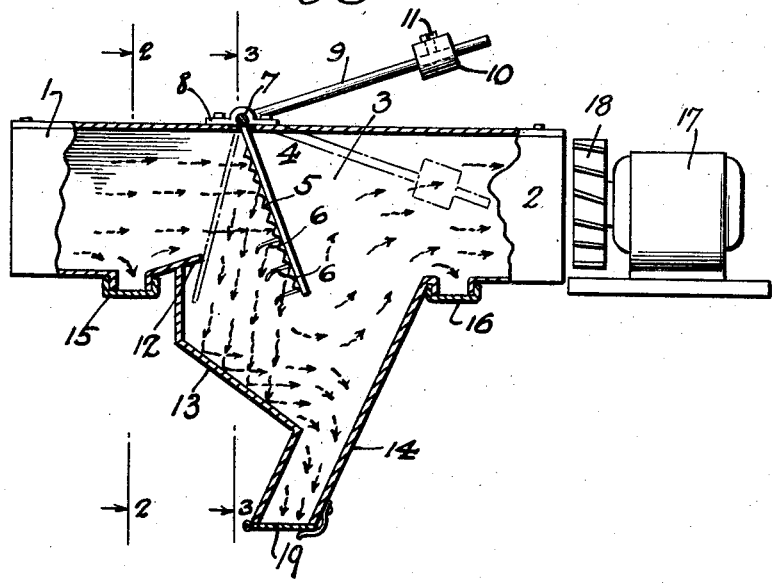
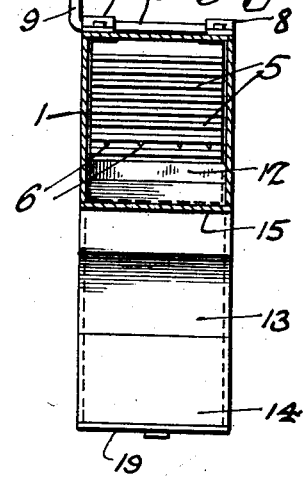
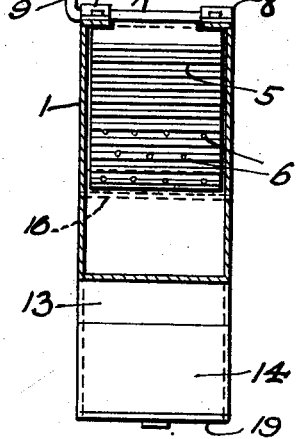
Raymon C. Huneycutt,
Inventor
by
Lester L. Sargent
Attorney Patented Jan. 7, 1930

1,742,812

UNITED STATES PATENT OFFICE

RAYMON C. HUNEYCUTT, OF STANFIELD, NORTH CAROLINA

COTTON-GIN ATTACHMENT

Application filed February 4, 1929. Serial No. 337,408.

The object of my invention is to provide a novel and useful attachment for cotton gins for the purpose of separating sticks, stones and other foreign matter from the cotton.

I attain these and other objects of my invention by the device illustrated in the accompanying drawings, in which,—

Figure 1 is a vertical section through my invention, partly in side elevation;

Fig. 2 is a section on line 2—2 of Fig. 1; and

Fig. 3 is a vertical section on line 3—3 of Fig. 1.

Like numerals designate like parts in each of the drawings.

Referring to the drawings, I provide an intake chute 1 and an exit chute 2 having a connecting chamber 4 in which is mounted a corrugated sheet or baffle 5 which in addition to its corrugations is provided with spikes 6. The baffle 5 is suspended from a transverse rod 7 which is detachably secured by the removable bearings 8, as shown in Fig. 1, which members are bolted on the respective chutes 1 and 2 and are removable.

The rod 7 is bent at right angles at one side of the machine to form the balancing rod portion 9 which carries a weight 10 adjustably secured on the rod by the set screw 11. The bottom of the intake chute 1 is provided with a pocket 15 and the bottom of the exit chute is provided with a similar pocket 16 the bottoms of these pockets being preferably removable. I also provide a projecting strip 12, as shown in Fig. 1, and directly beneath this strip extending beyond the same I provide a slanting wall 13 on which the foreign matter or heavy material which strikes the baffle plate will flow and thence flow downwardly and out through the discharge chute 19. One side of the discharge opening is provided with a slanting wall 14 which extends upwardly to the bottom of the inner lower end of the exhaust chute 2, as shown in Fig. 1.

I may provide any suitable suction for sucking a current of air through the device and have illustrated a conventional motor 17 and conventional fan 18 for the purpose.

The operation of the device is indicated by the arrows in Fig. 1 of the drawings. The lighter material passes under the baffle and on out through the exhaust chute 2. The heavier material or foreign matter strikes the baffle and falls to the slanting wall 13 and thence out through the discharge chute 19. Sometimes a nail or rock will get wound up in a ball of cotton and the spikes 6 function to tear up such balls of cotton and thereby release the nail or rock so that it will drop down through the discharge chute 19. The operation of the baffle may be regulated by adjusting the weight element 10 to the desired position on rod 9. Pressure is regulated by adjusting the weight 10 on the rod 9. Spikes 6 have their points curved downwardly to throw the cotton down and prevent its being held on the spikes.

What I claim is:

1. An attachment for cotton gins for separating foreign substances from the cotton, comprising an intake chute and an exit chute suitably connected to form a continuous chamber, an adjustable baffle plate suspended from the top of said chamber and held open by the suction air current, the chamber having a slanting wall disposed below the baffle plate, a discharge opening in which the slanting wall terminates, the discharge opening also having an oppositely slanting wall extending upwardly to the bottom of the exit chute, and weight-controlled means for adjusting the position of the baffle plate.

2. An attachment for cotton gins for separating foreign substances from the cotton, comprising an intake chute and an exit chute suitably connected to form a continuous chamber, an adjustable baffle plate suspended from the top of said chamber and held open by the suction air current, the chamber having a slanting wall disposed below the corrugated baffle plate, a discharge opening in which the slanting wall terminates, the discharge opening also having an oppositely slanting wall extending upwardly to the bottom of the exit chute, and weight-controlled means for adjusting the position of the baffle plate.

3. An attachment for cotton gins for separating foreign substances from the cotton, comprising an intake chute and an exit chute suitably connected to form a continuous chamber, an adjustable baffle plate suspended from the top of said chamber and held open by the suction air current when the machine is in operation, said baffle plate having spikes projecting in the direction of the intake chute, a discharge opening in which the slanting wall terminates, the discharge opening also having an oppositely slanting wall extending upwardly to the bottom of the exit chute, and weight-controlled means for adjusting the position of the baffle plate.

4. An attachment for cotton gins for separating foreign substances from the cotton, comprising an intake chute and an exit chute suitably connected to form a continuous chamber, an adjustably weighted baffle plate suspended from the top of said chamber and held open by the suction air current, the chamber having a slanting wall disposed below the baffle plate, a discharge opening in which the slanting wall terminates, the discharge opening also having an oppositely slanting wall extending upwardly to the bottom of the exit chute, weight-controlled means for adjusting the position of the baffle plate, and a pocket in the bottom portion of the intake chute and a similar pocket in the bottom portion of the exit chute.

5. An attachment for cotton gins for separating foreign substances from the cotton, comprising an intake chute and an exit chute suitably connected to form a continuous chamber, an adjustably weighted baffle plate suspended from the top of said chamber and held open by the suction air current, the chamber having a slanting wall disposed below the baffle plate, a discharge opening in which the slanting wall terminates, the discharge opening also having an oppositely slanting wall extending upwardly to the bottom of the exit chute, weight-controlled means for adjusting the position of the baffle plate, a pocket in the bottom portion of the intake chute and a similar pocket in the bottom portion of the exit chute, the device including a strip projecting inwardly toward the baffle plate beyond the pocket of the intake chute and extending above the upper portion of the slanting wall disposed beneath the baffle plate.

6. An attachment for cotton gins for separating foreign substances from the cotton, comprising an intake chute and an exit chute suitably connected to form a continuous chamber, an adjustably weighted baffle plate suspended from the top of said chamber and held open by the suction air current, the chamber having a slanting wall disposed below the baffle plate, a rod on which the baffle plate is mounted, bearings detachably secured to the top of the device and engaging the said rod, an extension rod bent at right angles to the said rod, and an adjustable weight mounted on said extension rod.

RAYMON C. HUNEYCUTT.